(12) United States Patent
Okamoto et al.

(10) Patent No.: US 7,919,429 B2
(45) Date of Patent: Apr. 5, 2011

(54) ZIRCONIA-CERIA-YTTRIA-BASED MIXED OXIDE AND PROCESS FOR PRODUCING THE SAME

(75) Inventors: Hiroshi Okamoto, Osaka (JP); Hiroshi Kodama, Osaka (JP)

(73) Assignee: Daiichi Kigenso Kagaku Kogyo Co., Ltd., Osaka-shi, Osaka-fu (JP)

(*) Notice: Subject to any disclaimer, the term of this patent is extended or adjusted under 35 U.S.C. 154(b) by 536 days.

(21) Appl. No.: 11/871,376

(22) Filed: Oct. 12, 2007

(65) Prior Publication Data

US 2008/0090723 A1 Apr. 17, 2008

(30) Foreign Application Priority Data

Oct. 12, 2006 (JP) .................................. 2006-305934
Aug. 8, 2007 (JP) .................................. 2007-206394

(51) Int. Cl.
 *B01J 23/00* (2006.01)
 *B01J 23/10* (2006.01)
(52) U.S. Cl. .................... 502/304; 502/302; 502/349
(58) Field of Classification Search .................. 502/304, 502/349, 350, 355
See application file for complete search history.

(56) References Cited

U.S. PATENT DOCUMENTS

| 4,624,940 A * | 11/1986 | Wan et al. ............ 502/251 |
| 5,057,483 A * | 10/1991 | Wan ..................... 502/304 |
| 6,087,298 A * | 7/2000 | Sung et al. ............ 502/333 |
| 6,228,799 B1 | 5/2001 | Aubert et al. |
| 6,387,338 B1 * | 5/2002 | Anatoly et al. ........ 423/239.1 |
| 6,468,941 B1 * | 10/2002 | Bortun et al. ......... 502/300 |
| 6,585,944 B1 * | 7/2003 | Nunan et al. .......... 423/239.1 |
| 2006/0210462 A1 * | 9/2006 | Larcher et al. ........ 423/213.2 |
| 2007/0244002 A1 * | 10/2007 | Kozlov ................. 502/304 |
| 2009/0274599 A1 * | 11/2009 | Larcher et al. ........ 423/213.2 |

FOREIGN PATENT DOCUMENTS

| EP | 1 006 081 A1 | 6/2000 |
| EP | 1 035 074 A1 | 9/2000 |
| EP | 1 894 620 A1 | 3/2008 |
| JP | 2000-169148 A | 6/2000 |
| JP | 2000-176282 A | 6/2000 |
| JP | 2003-277059 A | 10/2003 |
| JP | 3623517 B2 | 12/2004 |
| WO | 2007/093593 A1 | 8/2007 |

OTHER PUBLICATIONS

European Search Report dated May 11, 2009, issued in corresponding European Patent Application No. 07118246.3.

* cited by examiner

*Primary Examiner* — Stanley Silverman
*Assistant Examiner* — Anthony J Zimmer
(74) *Attorney, Agent, or Firm* — Westerman, Hattori, Daniels & Adrian, LLP

(57) ABSTRACT

The present invention provides a zirconia-ceria-yttria-based mixed oxide having a stable crystal structure after 12 hours of heat treatment at 1100° C. under a reducing atmosphere, and a process for producing the mixed oxide.

2 Claims, 2 Drawing Sheets

[Fig. 1]
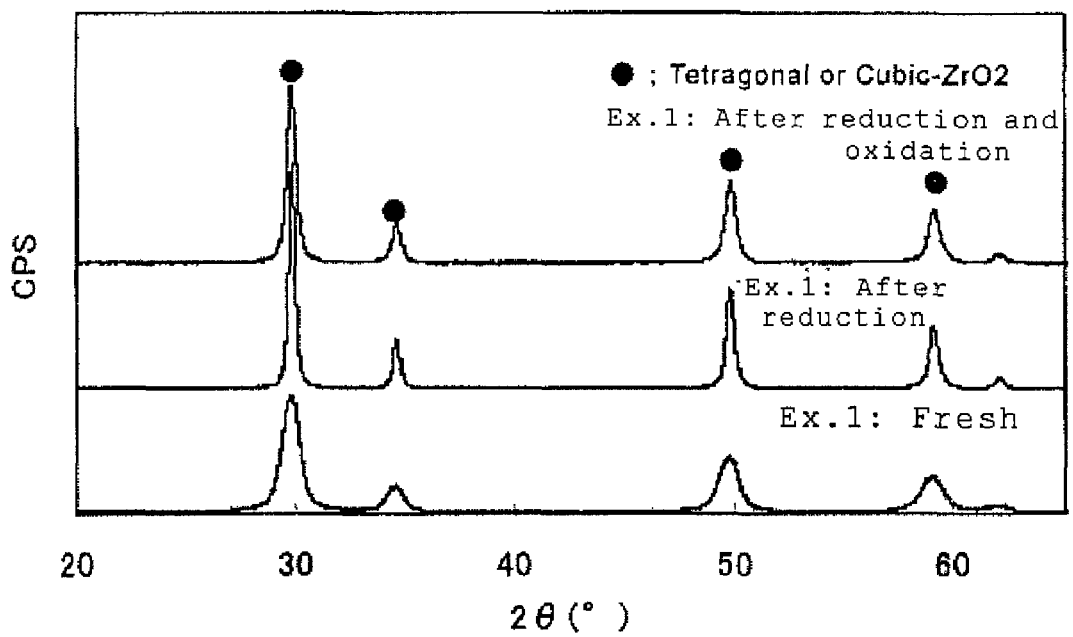
[Fig. 2]
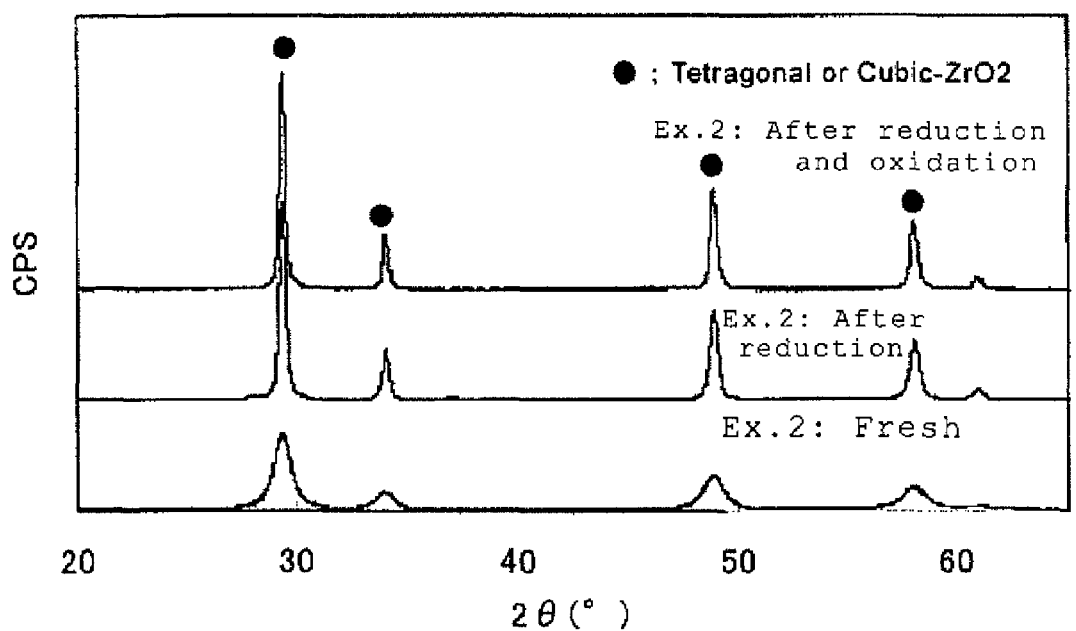

[Fig.3]
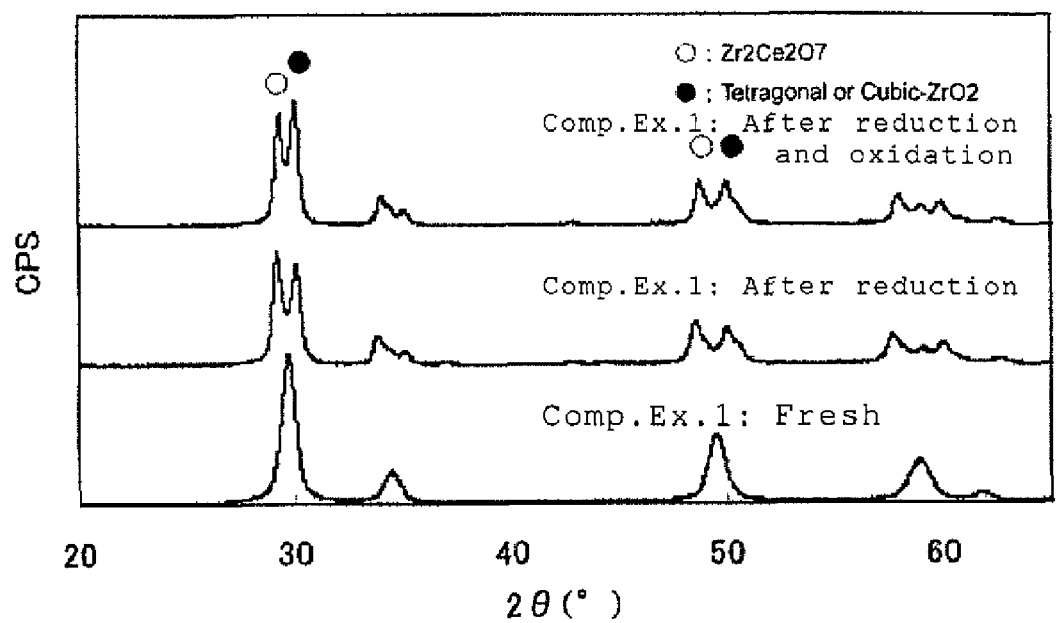

ZIRCONIA-CERIA-YTTRIA-BASED MIXED OXIDE AND PROCESS FOR PRODUCING THE SAME

TECHNICAL FIELD

The present invention relates to a zirconia-ceria-yttria-based mixed oxide and a process for producing the same.

BACKGROUND OF THE INVENTION

Since cerium oxide has a low oxidation-reduction potential of about 1.6 V between $Ce^{4+}$ and $Ce^{3+}$ and hence the reaction represented by the formula below proceeds reversibly, cerium oxide has an oxygen storage capacity (OSC) and is used due to this property as a promoter or a catalyst support in an automotive three-way catalyst.

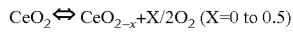

$CeO_2 \Leftrightarrow CeO_{2-x} + X/2O_2$ (X=0 to 0.5)

However, pure cerium oxide is well known to have an extremely low OSC of about X=0.005.

To improve this, there have been numerous reports that proposed that, by forming a solid solution of zirconium oxide in cerium oxide, (1) the heat resistance of the specific surface area of cerium oxide can be improved, (2) the OSC can be improved by inserting $Zr^{4+}$ having a small ionic radius into a Ce backbone to alleviate the increase in volume during the above-mentioned reaction, and addition of a third component leads to higher performance, etc.

The air-fuel ratio in automotive gasoline engines is electronically controlled for compete combustion in order to minimize air pollution caused by nitrogen oxides ($NO_x$), carbon monoxide (CO) and hydrocarbon (HC), an unburned component of gasoline, generated in the exhaust gas.

As a result, the oxygen concentration in the atmosphere fluctuates, i.e., there is more air than fuel (oxidative atmosphere) or more fuel than air (reducing atmosphere). Under such circumstances, cerium absorbs oxygen in an oxidative atmosphere and releases oxygen in a reducing atmosphere, thereby functioning to facilitate the oxidation reaction and the reduction reaction.

However, these reactions are repeated at high temperatures. It has been revealed that, for this reason, the volume fluctuation due to the cerium valency changes in response to the atmospheric changes distorts the crystal structure of a mixed oxide used as a promoter or a catalyst support to cause impaired stability, facilitating sintering of a precious metal used as a catalyst, thereby greatly affecting catalytic performance. Catalytic performances are known to be affected more in reducing atmosphere than in an oxidative atmosphere.

Considering the above, zirconia-ceria-based mixed oxides used as promoters or catalyst supports in automotive three-way catalysts are required to have not only standard heat resistance but also heat resistance against high temperatures under a reducing atmosphere. More specifically, zirconia-ceria-based mixed oxides capable of maintaining a stable crystal structure at high temperatures under a reducing atmosphere are demanded.

Japanese Patent No. 3623517 discloses a "composition composed of cerium oxide and zirconium oxide which has an atomic ratio of cerium/zirconium of at least 1, and which has a specific surface area of at least 35 $m^2/g$ after being calcined for 6 hours at 900° C. and an oxygen storage capacity of at least 1.5 ml/g $O_2$ at 400° C.", and "the composition being represented by the formula $Ce_xZr_yY_zO_2$ wherein z ranges from 0 to 0.3; when z is 0, x ranges from 0.5 to 0.95; x and y are such that x+y=1; when z is greater than 0, x/y ratio ranges from 1 to 19; and x, y and z are such that x+Y+z=1."

Japanese Unexamined Patent Publication No. 2000-176282 discloses "a catalyst for purifying a lean exhaust gas comprising:

i) an oxide solid solution containing a ceria-zirconia solid solution in which zirconium oxide is dissolved in cerium oxide, wherein the solid solubility of the zirconium oxide in the cerium oxide is 50% or higher, the average diameter of crystallite is 10 nm or less, the zirconium ratio is in a range of $0.55 \leq Zr/(Ce+Zr) \leq 0.90$ on a molar ratio basis, and an oxide of a rare earth element M other than cerium is further contained in a composition range of $0.03 \leq M/(Ce+Zr+M) \leq 0.15$ on a molar ratio basis;

ii) a fire-resistant porous substance; and iii) a catalytic precious metal supported on the oxide solid solution and/or the porous substance."

Further, Japanese Unexamined Patent Publication No. 2000-169148 discloses "a cerium-based mixed oxide represented by the following general formula, $Ce_{1-(a+b)}Zr_aY_b O_{2-b/2}$ wherein $0.06 \leq b/a \leq 0.27$."

However, Japanese Patent No. 3623517 merely describes "the specific surface area and OSC (oxygen storage capability) at the time of high temperature calcination", Japanese Unexamined Patent Publication No. 2000-176282 describes "the OSC (oxygen storage capacity) after durability tests", and Japanese Unexamined Patent Publication No. 2000-169148 describes "the OSC (oxygen storage capacity) after 5, 50 and 500 hours of durability tests in high temperature air of 1000° C.", and no description regarding "the stability of the crystal structure at high temperatures under a reducing atmosphere" is found in any of these documents.

Japanese Unexamined Patent Publication No. 2003-277059 discloses "a ceria-zirconia-based mixed oxide comprising $CeO_2$, $ZrO_2$, and an oxide of at least one additional element selected from the group consisting of rare earth elements, alkaline earth elements, and transition elements; and having a regular phase in which cerium ions and zirconium ions are regular arranged.

Japanese Unexamined Patent Publication No. 2003-277059 contains descriptions regarding "the ceria-zirconia-based mixed oxide having a high oxygen storage capacity (hereinafter referred to as OSC) and in which the phases are prevented from becoming separated under an oxidative atmosphere at 1000° C. or higher" and "Example 2 shows an x-ray diffraction chart and OSC measurement results of a powdered mixed oxide obtained by reducing the powdered oxide prepared in Example 1 for 5 hours at 1200° C. in a CO stream, treating the resultant for 5 hours at 1200° C. in the air, reducing the resultant for 5 hours at 1200° C. in a CO stream, and further treating the resultant for 1 hour at 500° C. in the air"; however, no description regarding "the stability of the crystal structure at high temperatures under a reducing atmosphere" is found.

DISCLOSURE OF THE INVENTION

The present invention was accomplished in view of the foregoing problems, and an object thereof is to provide a zirconia-ceria-yttria-based mixed oxide having a specific composition and maintaining a stable crystal structure after 12 hours of heat treatment at 1100° C. under a reducing atmosphere, and a process for producing the same.

The present inventors conducted extensive research to accomplish the above object, and found, in a process for producing a zirconia-ceria-yttria-based mixed oxide, that a zirconia-ceria-yttria-based mixed oxide having a stable crystal structure after 12 hours of heat treatment at 1100° C. under a reducing atmosphere can unexpectedly be produced by preparing a basic zirconium sulfate (solid)-yttrium hydroxide-containing mixed slurry beforehand, adding a cerium salt and, as required, salts of rare earth elements other than Ce and Y thereto to obtain a basic zirconium sulfate (solid)-yttrium hydroxide-cerium salt-containing mixed slurry, neutralizing the slurry to obtain a zirconium hydroxide-cerium hydroxide-yttrium hyroxide-containing mixed hydroxide, and heat-treating the mixed hydroxide.

The present invention provides the following, based on these findings.

Item 1. A zirconia-ceria-yttria-based mixed oxide comprising, on an oxide basis, 40 to 90% of $ZrO_2$, 5 to 50% of $CeO_2$, 5 to 30% of $Y_2O_3$, and 0 to 30% of at least one oxide of rare earth element other than Ce and Y, the zirconia-ceria-yttria-based mixed oxide having a stable crystal structure after 12 hours of heat treatment at 1100° C. under a reducing atmosphere.

Item 2. The zirconia-ceria-yttria-based mixed oxide according to Item 1 above, wherein one type of diffraction peak for zirconia in either a metastable tetragonal system or in a cubic system is observed on an X-ray diffraction profile.

Item 3. The zirconia-ceria-yttria-based mixed oxide according to Item (1) or (2) above, which has a specific surface area of 10 $m^2$/g or more after 12 hours of heat treatment at 1100° C. under a reducing atmosphere, and a further 3 hours of heat treatment at 1100° C. under air.

Item 4. A process for producing a zirconia-ceria-yttria-based mixed oxide, the process comprising the steps of:

(1) mixing a zirconium salt, an yttrium salt and an acid to obtain an zirconium-yttrium-containing acidic solution;

(2) adding a sulfating agent and an alkali to the zirconium-yttrium-containing acidic solution to obtain a yttrium hydroxide-zirconium salt-sulfating agent-containing slurry;

(3) heating the yttrium hydroxide-zirconium salt-sulfating agent-containing slurry to 65° C. or higher to obtain a basic zirconium sulfate-yttrium hydroxide-containing mixed slurry;

(4) adding a cerium salt, and, as necessary, on or more salts of rare earth elements other than Ce and Y to the basic zirconium sulfate-yttrium hydroxide-containing mixed slurry to obtain a basic zirconium sulfate-yttrium hydroxide-cerium salt-containing mixed slurry;

(5) adding an alkali to the basic zirconium sulfate-yttrium hydroxide-cerium salt-containing mixed slurry to obtain a zirconium hydroxide-cerium hydroxide-yttrium hydroxide-containing mixed oxide; and (6) heat-treating the zirconium hydroxide-cerium hydroxide-yttrium hydroxide-containing mixed hydroxide to obtain a zirconia-ceria-yttria-based mixed oxide.

BRIEF DESCRIPTION OF THE DRAWINGS

FIG. 1 shows XRD profiles of the zirconia-ceria-yttria-based mixed oxide obtained in Example 1, of the mixed oxide after reduction, and of the mixed oxide after reduction and oxidation.

FIG. 2 shows XRD profiles of the zirconia-ceria-yttria-based mixed oxide obtained in Example 2, of the mixed oxide after reduction, and of the mixed oxide after reduction and oxidation.

FIG. 3 shows XRD profiles of the zirconia-ceria-yttria-based mixed oxide obtained in Comparative Example 1, of the mixed oxide after reduction, and of the mixed oxide after reduction and oxidation.

BEST MODE OF CARRYING OUT THE INVENTION

The zirconia-ceria-yttria-based mixed oxide of the present invention and the process for producing the same are described in detail below.

The zirconia compounds used in the present invention are ordinary zirconia, and may include metal compounds impurities such as hafnia in an amount of 10% or less.

In the present invention, "%" indicates "wt. %=mass %", unless otherwise stated.

1. Zirconia-Ceria-Yttria-Based Mixed Oxide

The zirconia-ceria-yttria-based mixed oxide of the present invention is characterized in that it comprises, on an oxide basis, 40 to 90% of $ZrO_2$, 5 to 50% of $CeO_2$, 5 to 30% of $Y_2O_3$, and 0 to 30 wt. % of at least one oxide of rare earth element other than Ce and Y, and has a stable crystal structure after 12 hours of heat treatment at 1100° C. under a reducing atmosphere.

When $ZrO_2$ is present in an amount of below 40% or exceeding 90%, the thermal stability of the specific surface area is impaired, and hence is not desirable.

When $CeO_2$ is present in an amount of below 5%, the OSC (Oxygen Storage Capacity), which is required as for promoter functionality, is insufficient, whereas when the amount of $CeO_2$ exceeds 50%, the thermal stability of the specific surface area is impaired, and hence is not desirable.

When the amount of $Y_2O_3$ is below 5%, the stability of the crystal structure in a reducing atmosphere cannot be maintained, whereas when the amount of $Y_2O_3$ exceeds 30%, the thermal stability of the specific surface area is impaired.

Examples of rare earth elements other than Ce and Y include the lanthanoids such as La, Pr, Nd, etc., which are added for the purpose of enhancing the thermal stability of the specific surface area.

When the amount of at least one oxide of rare earth element other than Ce and Y exceeds 30%, the stability of the crystal structure in a reducing atmosphere cannot be maintained.

The crystal structure of the zirconia-ceria-yttria-based mixed oxide of the present invention preferably shows only one type of diffraction peak of zirconia which belongs to either a metastable tetragonal crystal system or a cubic crystal system when analyzed by x-ray diffraction (XRD).

The reason is to maintain the OSC functionality of ceria for an extended period of time, in automotive catalysts involving active fluctuations between oxidizing and reducing atmospheres, and to prevent precious metals from sintering by the thermal deterioration of a support, thereby prolonging the life of catalysts.

A feature of the zirconia-ceria-yttria-based mixed oxide of the present invention is that the crystal structure is stable even after 12 hours of heat treatment at 1100° C. under a reducing atmosphere. More specifically, in the mixed oxide of the present invention, each XRD peak does not substantially separate even after the heat treatment described above.

This is fully described in detail below. As described in Comparative Example 1, FIG. 3 shows x-ray diffraction results of (1) a conventional zirconia-ceria-yttria-based mixed oxide obtained by neutralizing a solution obtained by mixing zirconium oxychloride, cerium nitrate, and yttrium nitrate followed by filtration and calcination; (2) a mixed oxide obtained by heat-treating the conventional mixed oxide at 1100° C. for 12 hours under a reducing atmosphere (5 vol. % hydrogen/95 vol. % argon); and (3) a mixed oxide obtained by heat-treating the conventional mixed oxide at 1100° C. for 12 hours under a reducing atmosphere (5 vol. % hydrogen/95 vol. % argon) and further heat-treating the mixed oxide at 1100° C. for 3 hours under the air.

The diffraction results reveal the following.

(1) The mixed oxide after calcination (Fresh mixed oxide) shows one type of peak assigned to zirconia in a metastable tetragonal system (or cubic system) on the XRD profile.

(2) However, when said fresh mixed oxide was subjected to reduction treatment, a representative single peak in the vicinity of $2\theta=30°$ found before the reduction treatment is separated into two peaks, one peak assignable to $Ce_2Zr_2O_7$ in a pyrochlore phase and the other peak assignable to zirconia in a cubic system, and this shows that the crystal structure was changed. Namely, it demonstrates that the crystal structure is unstable in the reduction treatment. (3) Further, the peaks thus once separated into two do not merge back to a single peak as before, even when the mixed oxide is further heat-treated at 1100° C. for 3 hours under air; only peak intensity changes are observed.

As explained above, zirconia-ceria-yttria-based mixed oxides produced by conventional methods are not capable of maintaining a stable crystal structure when heat-treated at 1100° C. for 12 hours under a reducing atmosphere. For this reason, when these conventional mixed oxides are used as promoters or catalyst supports in automotive three-way catalysts, which are repeatedly exposed to oxidative atmospheres and reducing atmospheres, the crystal structure thereof is destroyed, impairing the stability thereof, and facilitating the sintering of a catalytic precious metal, largely resulting in catalytic performance deterioration.

On the other hand, FIG. 1 shows x-ray diffraction results for a zirconia-ceria-yttria-based mixed oxide obtained in Example 1 and having the same composition as the zirconia-ceria-yttria-based mixed oxide obtained in Comparative Example 1. The zirconia-ceria-yttria-based mixed oxide having the same composition as the mixed oxide prepared in Comparative Example 1 was produced by the process of the present invention described in Example 1. That is, a basic zirconia sulfate (solid)-yttrium hydroxide-containing mixed slurry was prepared beforehand; and then a cerium salt and, as required, at least one salt of rare earth element other than Ce and Y were added thereto to obtain a basic zirconium sulfate (solid)-yttrium hydroxide-cerium salt-containing mixed slurry, which was then neutralized to obtain a zirconium hydroxide-cerium hydroxide-yttrium hydroxide-containing mixed hydroxide, followed by heat-treating the obtained mixed hydroxide.

As revealed in FIG. 1, all three XRD profiles of (1) the mixed oxide after calcination (Fresh mixed oxide), (2) the mixed oxide heat-treated at 1100° C. for 12 hours under a reducing atmosphere (5 vol. % hydrogen/95 vol. % argon); and (3) the mixed oxide heat-treated at 1100° C. for 12 hours under a reducing atmosphere (5 vol. % hydrogen/95 vol. % argon) and further heat-treated at 1100° C. for 3 hours under air; are identical, and indicate that the crystal structures are stable in the reduction treatment. For example, the typical XRD single peak near $2\theta=30°$ is maintained after reduction, without being divided into two or more. This shows that the mixed oxide maintains a stable zirconia crystal structure in a metastable tetragonal system (or in a cubic system).

Accordingly, when the zirconia-ceria-yttria-based mixed oxide of the present invention is used as a promoter or catalyst support of automotive three-way catalysts which are repeatedly exposed to reducing atmospheres and oxidative atmospheres, the sintering of a catalyst precious metal is not facilitated by virtue of the stable crystal structure of the mixed oxide, whereby the life of a catalyst is estimated to be significantly prolonged.

The reason for this stability remains to be clarified at present; however, the notable difference in the crystal structure stability is presumably attributed to the bonding degree, between zirconia and yttria, i.e., the greatly improved stability of zirconia due to yttria, in comparison with conventional processes, because, in the present invention, a basic zirconium sulfate (solid)-yttrium hydroxide-containing mixed slurry is prepared beforehand, which is then made into a zirconium hydroxide-cerium hydroxide-yttrium hydroxide-containing mixed hydroxide, followed by heat-treating the obtained mixed hydroxide to produce a zirconia-ceria-yttria-based mixed oxide.

The zirconia-ceria-yttria-based mixed oxide of the present invention preferably has a specific surface area of 10 $m^2$/g or more, and more preferably 15 $m^2$/g or more, after 12 hours of heat treatment at 1100° C. under a reducing atmosphere, and further after 3 hours of heat treatment at 1100° C. under the air. When the specific surface area is below 10 $m^2$/g, the deteriorated specific surface area facilitates the sintering of a catalyst precious metal and causes the catalytic performance to be impaired.

In the present invention, "reducing atmosphere" directly refers to an atmosphere of "5 vol % hydrogen/95 vol % argon", but is not limited thereto. Atmospheres with other conditions may be included insofar as the equivalent "reducing atmosphere" is provided.

2. Process for Producing Zirconia-Ceria-Yttria-Based Mixed Oxide

The production process of the present invention comprises the steps of:

(1) mixing a zirconium salt, an yttrium salt and an acid to obtain a zirconium-yttrium-containing acidic solution;

(2) adding a sulfating agent and an alkali to the zirconium-yttrium-containing acidic solution to obtain an yttrium hydroxide-zirconium salt-sulfating agent-containing slurry;

(3) heating the yttrium hydroxide-zirconium salt-sulfating agent-containing slurry to 65° C. or higher to obtain a basic zirconium sulfate-yttrium hydroxide-containing mixed slurry;

(4) adding a cerium salt, and, as required, at least one salt of rare earth elements other than Ce and Y to the basic zirconium sulfate-yttrium hydroxide-containing mixed slurry to obtain a basic zirconium sulfate-yttrium hydroxide-cerium salt-containing mixed slurry;

(5) adding an alkali to the basic zirconium sulfate-yttrium hydroxide-cerium salt-containing mixed slurry to obtain a zirconium hydroxide-cerium hydroxide-yttrium hydroxide-containing mixed oxide; and (6) heat-treating the zirconium hydroxide-cerium hydroxide-yttrium hydroxide-containing mixed hydroxide to obtain a zirconia-ceria-yttria-based mixed oxide.

Hereinafter each step is described in detail.

(1) First Step

In the first step of the present invention, a zirconium salt, an yttrium salt, and an acid are mixed to obtain a zirconium-yttrium-containing acidic solution. The obtained zirconium-yttrium-containing acidic solution is a solution which contains zirconium and yttrium and indicates acidity.

Any zirconium salt insofar as it provides zirconium ions may be used, and one or more of, for example, zirconium oxynitrate, zirconium oxychloride, zirconium nitrate, etc., may be used. Among these, zirconium oxychloride is preferably used in view of superior productivity on a commercial scale.

The solvent of the aforementioned solution may be suitably selected in accordance with the kind of zirconium salt to be used and other factors. It is typically desirable to use water (pure water, ion exchange water, the same applies hereinafter).

The concentration of the zirconium salt solution is not limited, but it is preferable that 5 to 250 g, and particularly 20 to 200 g, of the zirconium salt, calculated as zirconium oxide ($ZrO_2$), be typically contained in 1000 g of the solvent.

Any yttrium salt insofar as it provides yttrium ions may be used, and one or more of, for example, yttrium nitrate, yttrium chloride, etc., may be used. Among these, yttrium nitrate is preferably used in view of superior productivity on a commercial scale.

The yttrium salt concentration in the zirconium salt-yttrium salt mixed solution is not limited, but it is preferable that 5 to 250 g, and particularly 20 to 200 g, of the yttrium salt, calculated as yttrium oxide ($Y_2O_3$), be typically contained in 1000 g of the solvent.

The acid usable is not limited, but preferable examples include sulfuric acid, nitric acid, hydrochloric acid, etc. In particular, hydrochloric acid is desirable in view of superior productivity on a commercial scale.

The free acid concentration in the mixed solution is not limited, but is preferably 0.2 to 2.2 N (normal).

(2) Second Step

In the second step, a sulfating agent (reagent for forming sulfate) and alkali are added to the above mentioned zirconium-yttrium-containing acidic solution to obtain an yttrium hydroxide-zirconium salt-sulfating agent-containing slurry. In this step, yttrium salt is converted to an yttrium hydroxide and the sulfating agent required in the third step is contained in the solution.

The sulfating agent and alkali may be added together. Alternatively, the sulfating agent may be added after the alkali is added, or alkali may be added after the sulfating agent is added.

The sulfating agent is not limited, and usable examples include compounds containing the sulfate ion ($SO_4^{2-}$) such as $Na_2SO_4$, $(NH_4)_2SO_4$, $H_2SO_4$, etc.

The alkali is not limited, and usable examples include ammonium hydroxide, ammonium bicarbonate, sodium hydroxide, potassium hydroxide, etc.

When a sulfating agent and alkali are added together, the may be added in the form of an alkaline sulfating agent such as ($NaOH+Na_2SO_4$) solution, ($NH_4O+(NH_4)_2SO_4$) solution, etc., may be added.

The sulfating agent is preferably added so that the weight ratio of the sulfate ion ($SO_4^{2-}$)/$ZrO_2$ is 0.3 to 0.6.

The alkali is added in an amount so that the pH is 7 to 11 after the addition of alkali, whereby yttrium salt is converted to yttrium hydroxide.

(3) Third Step

In the third step, the aforementioned ytrrium hydroxide-zirconium salt-sulfating agent-containing slurry is heated to 65° C. or higher, and preferably 70° C. or higher, to obtain a basic zirconium sulfate-yttrium hydroxide-containing mixed slurry.

In this step, zirconium salt reacts with the sulfating agent, whereby a basic zirconium sulfate is formed.

The maximum heating temperature is not limited, but is typically up to about 100° C.

The basic zirconium sulfate (solid) to be generated is not limited, but examples include hydrates of the compounds represented by, for example, $ZrOSO_4.ZrO_2$, $5ZrO_2.3SO_3.7ZrO_2.3SO_3$, etc. These may be used singly, or a mixture of at least two of them may be used.

(4) Fourth Step

In the fourth step, a cerium salt and, as required, at least one salt of rare earth elements other than Ce and Y are added to the aforementioned basic zirconium sulfate-yttrium hydroxide-containing mixed slurry to obtain a basic zirconium sulfate-yttrium hydroxide-cerium salt-containing mixed slurry.

Examples of cerium salts include hydrochloride, nitrate, sulfate, etc., but nitrate is preferably used in view of superior productivity on a commercial scale.

The concentration of cerium salt in the basic zirconium sulfate-yttrium hydroxide-cerium salt-containing mixed slurry is not limited, but it is desirable that 5 to 300 g, and particularly 20 to 270 g, of the cerium salt, calculated as cerium oxide ($CeO_2$), be typically contained in 1000 g of the solvent.

(5) Fifth Step

In the fifth step, alkali is added to the aforementioned basic zirconium sulfate-yttrium hydroxide-cerium salt-containing mixed slurry to obtain a zirconium hydroxide-cerium hydroxide-yttrium hydroxide-containing mixed hydroxide.

The alkali is not limited, and usable examples include ammonium hydroxide, ammonium bicarbonate, sodium hydroxide, potassium hydroxide, etc. Among these, sodium hydroxide is preferably used in view of its industrial application at low cost.

The amount of alkali to be added is not limited as long as precipitates can be formed from the above solution, and is typically added so that the pH of the above solution is 11 or higher, and preferably 12 to 14.

After completion of the neutralization reaction, it is desirable that the solution containing the zirconium hydroxide-cerium hydroxide-yttrium hydroxide-containing mixed hydroxide be maintained at 35 to 60° C. for at least 1 hour, so as to effect aging and facilitate filtration of the obtained precipitates.

The thus generated zirconium hydroxide-cerium hydroxide-yttrium hydroxide-containing mixed hydroxide is recovered by a solid-liquid-separation method. The solid-liquid-separation method may be performed by a known method such as filtration, centrifugal separation, decantation, etc.

After recovery, the zirconium hydroxide-cerium hydroxide-yttrium hydroxide-containing mixed hydroxide is preferably washed with water as necessary to remove impurities attached thereto.

The obtained hydroxide may further be dried as necessary. The drying can be performed in accordance with known method, which may be any of air drying, beat drying, etc.

Further, grinding treatment, classification processing, etc. can be carried out, if necessary, after the drying.

(6) Sixth Step

In the sixth step, the zirconium hydroxide-cerium hydroxide-yttrium hydroxide-containing mixed hydroxide is heat-treated to obtain a zirconia-ceria-yttria-based mixed oxide.

The heat treatment temperature is not limited, but the heat treatment is typically performed at typically about 400 to 900° C. for 1 to 5 hours.

The heat treatment atmosphere is not limited, but may typically be in the air or an oxidative atmosphere.

The thus obtained mixed oxide may be pulverized as required. The grinding method is not limited, and the mixed oxide can be ground using a mill such as a planetary mill, ball mill, jet mill, etc.

ADVANTAGES OF THE INVENTION

The present invention provides a zirconia-ceria-yttria-based mixed oxide having a stable crystal structure even after 12 hours of heat treatment at 1100° C. under a reducing atmosphere, preferably showing a diffraction peak of zirconia in either a metastable tetragonal system or in a cubic system on an X-ray diffraction profile, and having improved heat resistance of the specific surface area; and a process for producing such a mixed oxide. The mixed oxide can be advantageously used in the art, particularly as a co-catalyst, catalyst support, etc.

EXAMPLES

The present invention will be described in further detail with reference to the examples below. The present invention is not, however, limited to or limited by these Examples.

In the Examples, the following properties were measured using the following methods.
(1) Specific Surface Area
Specific surface area was measured by the BET method using a specific surface area analyzer (FlowSorb II, product of Micromeritics, Inc).

Example 1

Zirconium oxychloride octahydrate in an amount of 70 g calculated as $ZrO_2$ and an yttrium nitrate solution in an amount of 10 g calculated as $Y_2O_3$ were used to prepare a mixed solution. Using 35% hydrochloric acid and ion exchange water, the acid concentration and $ZrO_2$ concentration in the mixed solution were adjusted to 0.67 N and 4 w/v %, respectively.

The obtained solution was heated to 70° C., a 5% sodium sulfate solution, adjusted with sodium hydroxide to a pH of 12.5, was added to the solution and heated to 95° C.

The mixed solution was maintained at the heated temperature for 15 minutes to obtain a basic zirconium sulfate-yttrium hydroxide-containing mixed slurry.

Subsequently, to the basic zirconium sulfate-yttrium hydroxide-containing mixed slurry, a cerium nitrate solution in an amount of 20 g calculated as $CeO_2$ was added.

500 g of a 25% sodium hydroxide aqueous solution was further added to obtain a zirconium hydroxide-cerium hydroxide-yttrium hydroxide-containing mixed hydroxide slurry.

Thereafter, the slurry was filtered and washed to obtain a zirconium hydroxide-cerium hydroxide-yttrium hydroxide-containing mixed hydroxide.

The thus obtained mixed hydroxide was calcined at 650° C. for 5 hours to obtain the desired oxide. The oxide was ground in a mortar until its particle diameter was 20 μm or less.

The specific surface area shown in Table 1 was measured, and durability tests ware also performed. Thereafter, the specific surface area and x-ray diffraction (XRD) were measured. The results are shown in Table 1 and FIG. 1.
<Durability Test>
The oxide was heat-treated at 1100° C. for 12 hours under a 5 vol % hydrogen/95 vol % argon gas atmosphere, and further heat-treated at 1100° C. for 3 hours under the air.

Example 2

Zirconium oxychloride octahydrate in an amount of 45 g calculated as $ZrO_2$, and an yttrium nitrate solution in an amount of 7 g calculated as $Y_2O_3$ were used to prepare a mixed solution. Using 35% hydrochloric acid and ion exchange water, the acid concentration and $ZrO_2$ concentration in the mixed solution were adjusted to be 0.67 N and 4 w/v %, respectively.

To the obtained solution was added a 5% sodium sulfate solution adjusted with sodium hydroxide to a pH of 12.5 and heated to 95° C.

The mixed solution was maintained at the heated temperature for 15 minutes to obtain a basic zirconium sulfate-yttrium hydroxide-containing mixed slurry.

To the basic zirconium sulfate-yttrium hydroxide-containing mixed slurry, a cerium nitrate solution in an amount of 45 g calculated as $CeO_2$, and a lanthanum nitrate in an amount of 3 g calculated as $La_2O_3$, were added.

500 g of a 25% sodium hydroxide aqueous solution was further added to obtain a zirconium hydroxide-cerium hydroxide-yttrium hydroxide-lanthanum hydroxide-containing mixed hydroxide slurry.

Thereafter, the slurry was filtered and washed to obtain a zirconium hydroxide-cerium hydroxide-yttrium hydroxide-lanthanum hydroxide-containing mixed hydroxide.

The thus obtained mixed hydroxide was calcined at 650° C. for 5 hours to obtain the desired oxide. The oxide was ground in a mortar until its particle diameter was 20 μm or less.

The specific surface area shown in Table 1 was measured, and durability tests ware also performed. Thereafter, the specific surface area and x-ray diffraction (XRD) were measured. The results are shown in Table 1 and FIG. 2.

Comparative Example 1

Zirconium oxychloride octahydrate in an amount of 70 g calculated as $ZrO_2$, a cerium nitrate solution in an amount of 20 g calculated as $CeO_2$ and an yttrium nitrate solution in an amount of 10 g calculated as $Y_2O_3$ were used to prepare a mixed solution. Using 35% hydrochloric acid and ion exchange water, the acid concentration and $ZrO_2$ concentration in the mixed solution were adjusted to be 0.67 N and 4 w/v %, respectively.

To the obtained solution was added 500 g of 25% ammonia aqueous solution to obtain a zirconium hydroxide-cerium hydroxide-yttrium hydroxide-containing mixed hydroxide slurry.

Thereafter, the slurry was filtered and washed to obtain a zirconium hydroxide-cerium hydroxide-yttrium hydroxide-containing mixed hydroxide.

The thus obtained mixed hydroxide was calcined at 650° C. for 5 hours to obtain the intended oxide. The oxide was ground in a mortar until its particle diameter was 20 μm or less.

The specific surface area shown in Table 1 was measured and durability test was also performed. The specific surface area and x-ray diffraction (XRD) were measured later. The results are shown in Table 1 and FIG. 3.

TABLE 1

Measurement Results

|  | EXAMPLE 1 | EXAMPLE 2 | COMPARATIVE EXAMPLE 1 |
| --- | --- | --- | --- |
| $ZrO_2$, wt. % | 70 | 45 | 70 |
| $CeO_2$, wt. % | 20 | 45 | 20 |
| $Y_2O_3$, wt. % | 10 | 7 | 10 |
| $La_2O_3$, wt. % | — | 3 | — |
| SA, $m^2/g$ | 70 | 70 | 60 |
| Aged SA*1, $m^2/g$ | 35 | 45 | 33 |
| Aged SA*2, $m^2/g$ | 15 | 25 | 3 |

*1) After heat treatment at 1000° C. for 3 hours
*2) After heat treatment at 1100° C. for 12 hours under a 5 vol % hydrogen/95 vol % argon gas atmosphere, and further heat treatment at 1100° C. for 12 hours under the air.

As seen from Table 1 and FIGS. 1 to 3, the zirconia-ceria-yttria-based mixed oxide of the present invention has a stable crystal structure even after 12 hours of heat treatment at 1100° C. under a reducing atmosphere, and further has a specific surface area of 15 m$^2$/g or more with an improved heat resistance even after 12 hours of heat treatment at 1100° C. under a reducing atmosphere, and a further 3 hours of heat treatment at 1100° C. under the air.

The invention claimed is:

1. A zirconia-ceria-yttria-based mixed oxide comprising, on an oxide basis, 40 to 90% of $ZrO_2$, 5 to 50% of $CeO_2$, 5 to 30% of $Y_2O_3$, and 0 to 30% of at least one oxide of rare earth element other than Ce and Y;

the zirconia-ceria-yttria-based mixed oxide having a stable crystal structure after 12 hours of heat treatment at 1100° C. under a reducing atmosphere; and the zirconia-ceria-yttria-based mixed oxide having a specific surface area of 15 m$^2$/g or more after 12 hours of heat treatment at 1100° C. under a reducing atmosphere, and a further 3 hours of heat treatment at 1100° C. under air.

2. The zirconia-ceria-yttria-based mixed oxide according to claim 1, wherein one type of diffraction peak for zirconia in either a metastable tetragonal system or in a cubic system is observed on an X-ray diffraction profile.

* * * * *